DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 275

T904,024

CHEMICALLY CROSS-LINKED POLYETHYLENE STABILIZED WITH SULFUR CONTAINING ALKYLESTERS OF HINDERED HYDROXYPHENYLALKANOIC ACIDS

Peter Klemchuk, Yorktown Heights, N.Y., assignor to Ciba-Geigy Corporation, Greenburgh, N.Y.

Filed Jan. 3, 1972, Ser. No. 215,113

Int. Cl. C08f *45/58;* C08g *51/58*

U.S. Cl. 260—45.85 B

No Drawing. 18 Pages Specification

Cross-linked polyethylene can be successfully stabilized without interfering with the cross-linking step during processing, by incorporating therein a sulfur containing alkylester of a hindered hydroxyphenylalkanoic acid, said ester being derived from a 2:1 mol ratio of said acid with a thio bis (alkanol).

These additives may be used alone or in combination with dialkylester sulfide such as distearylthiodipropionate and dilaurylthiodipropionate. Other additives, such as metal deactivators, pigments, carbon black and the like may also be present. Chemically cross-linked polyethylene is particularly useful as an insulation for high voltage power cables.